United States Patent
Crucs (10) Patent No.: US 8,300,964 B2
(45) Date of Patent: Oct. 30, 2012

(54) SYSTEM AND METHOD FOR PREPARING SPATIALLY RELATED MEDICAL DIGITAL IMAGE DATA SETS FOR IMAGE COMPRESSION AND STORAGE PRIOR TO IMAGE RECONSTRUCTION

(75) Inventor: Kevin M. Crucs, Copley, OH (US)

(73) Assignee: Apteryx Inc., Akron, OH (US)

( * ) Notice: Subject to any disclaimer, the term of this patent is extended or adjusted under 35 U.S.C. 154(b) by 1119 days.

(21) Appl. No.: 12/187,667

(22) Filed: Aug. 7, 2008

(65) Prior Publication Data

US 2010/0034474 A1  Feb. 11, 2010

(51) Int. Cl.
*G06K 9/46* (2006.01)
(52) U.S. Cl. ............................................. 382/236
(58) Field of Classification Search .................. None
See application file for complete search history.

(56) References Cited

U.S. PATENT DOCUMENTS

| | | | |
|---|---|---|---|
| 4,163,992 A | 8/1979 | Inaba et al. | |
| 4,200,890 A | 4/1980 | Inaba et al. | |
| 4,409,618 A | 10/1983 | Inaba et al. | |
| 5,267,334 A | 11/1993 | Normille et al. | |
| 5,594,503 A | 1/1997 | Miyazawa | |
| 7,050,637 B2 | 5/2006 | Akiyoshi et al. | |
| 7,099,511 B2 * | 8/2006 | Shinagawa et al. | 382/236 |
| 7,221,409 B2 | 5/2007 | Akiyoshi et al. | |
| 7,336,763 B2 | 2/2008 | Spartiotis et al. | |
| 7,676,022 B2 | 3/2010 | Pantsar et al. | |
| 2002/0172289 A1 | 11/2002 | Akiyoshi et al. | |
| 2002/0191112 A1 | 12/2002 | Akiyoshi et al. | |
| 2003/0185307 A9 | 10/2003 | Akiyoshi et al. | |
| 2006/0140492 A1 | 6/2006 | Akiyoshi et al. | |
| 2007/0031062 A1 | 2/2007 | Pal et al. | |
| 2007/0183511 A1 | 8/2007 | Akiyoshi et al. | |
| 2007/0206672 A1 | 9/2007 | Yamashita et al. | |

FOREIGN PATENT DOCUMENTS

EP 1367833 12/2003
WO 2006081314 8/2006

* cited by examiner

*Primary Examiner* — Claire X Wang
(74) *Attorney, Agent, or Firm* — Hahn Loeser & Parks LLP (57) ABSTRACT

System and method for preparing spatially related medical digital image data sets for image compression and storage prior to image reconstruction. The system and method exploit the similarities between spatially adjacent digital image data sets to reduce the amount of data to be compressed and stored. The spatially adjacent digital image data sets correspond to a plurality of spatially contiguous digital image data sets acquired over, for example, a current anatomical portion of a patient using a medical imaging modality or, for example, a current portion of a man-made structure or a current portion of a geological feature using an imaging modality.

51 Claims, 6 Drawing Sheets

FIG. 6A $\Delta_1$ (A & B not very similar)

FIG. 6B $\Delta_2$ (B & C somewhat similar)

FIG. 6C $\Delta_3$ (C & D very similar)

SYSTEM AND METHOD FOR PREPARING SPATIALLY RELATED MEDICAL DIGITAL IMAGE DATA SETS FOR IMAGE COMPRESSION AND STORAGE PRIOR TO IMAGE RECONSTRUCTION

TECHNICAL FIELD

Certain embodiments of the present invention relate to processing of acquired image data. More particularly, certain embodiments relate to a system and a method for preparing spatially related medical digital image data sets for image compression and storage prior to image reconstruction.

BACKGROUND

Today's acquired medical image scans (e.g., CT and 3D image scans) take up an incredible amount of storage space when saved. Even when using standard compression schemes, a typical dental CT scan may take up between 500 megabytes and 600 megabytes of storage space.

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

Embodiments of the present invention take advantage of the spatial relationships of acquired digital image data sets. In particular, embodiments of the present invention exploit the similarities between spatially adjacent digital image data sets to reduce the amount of data to be compressed and stored.

An embodiment of the present invention comprises a method of processing acquired image data. The method includes the step (a) of performing a comparison operation on a current digital image data set and a next spatially adjacent digital image data set across a plurality of spatially contiguous digital image data sets to form a plurality of comparative image data sets. The plurality of spatially contiguous digital image data sets may be acquired over a current anatomical portion of a patient using a medical imaging modality. As an alternative, the plurality of spatially contiguous digital image data sets may be acquired over a current portion of a man-made structure or a current portion of a geological feature using, for example, a sonic imaging modality. The method further includes the step (b) of performing a first image compression operation on a designated keystone digital image data set of the plurality of spatially contiguous digital image data sets to form a compressed keystone data set. The method also includes the step (c) of performing a second image compression operation on each of the plurality of comparative image data sets to form a plurality of compressed comparative data sets. The method further includes the step (d) of storing the compressed keystone data set and the plurality of compressed comparative data sets. The storing may include electronically saving to an electronic digital memory.

The method may further include repeating the steps (a) through (d) for a next anatomical portion of the patient (or a next structural or geological portion), wherein the next anatomical portion of the patient (or the next structural or geological portion) is spatially adjacent to the current portion. At least one of the image compression operations may include a wavelet-based image compression scheme, a fractal-type image compression scheme, a JPEG-type image compression scheme, a run-length encoding compression scheme, or a superstring compression scheme, for example. The first image compression operation may be the same as or different than the second image compression operation.

The spatially contiguous digital image data sets may correspond to spatially contiguous slices across the current anatomical portion of the patient, or to spatially contiguous views around the current anatomical portion of the patient, for example. The comparison operation may include a simple pixel-by-pixel (or voxel-by-voxel) subtraction between the current digital image data set and the next spatially adjacent digital image data set, for example.

The method may further include applying at least one thresholding operation to each of the plurality of comparative image data sets before performing the second image compression operation. The method may also include applying at least one spatial filtering operation to each of the plurality of comparative image data sets before performing the second image compression operation. The method may further include applying at least one data scaling operation to each of the plurality of comparative image data sets before performing the second image compression operation.

The method may further include performing a first image decompression operation on the stored compressed keystone data set to form an uncompressed designated keystone digital image data set, and performing a second image decompression operation on the stored plurality of compressed comparative data sets to form an uncompressed plurality of comparative image data sets. The first image decompression operation may be the same as or different than the second image decompression operation.

The method may further include performing a re-building operation on the uncompressed designated keystone digital image data set and the uncompressed plurality of comparative image data sets to form a re-built plurality of spatially contiguous digital image data sets. The method may further include applying a set of image processing parameters to the re-built plurality of spatially contiguous digital image data sets during an image processing operation to form an image processed plurality of spatially contiguous digital image data sets. The method may further include performing an image reconstruction operation on the image processed plurality of spatially contiguous digital image data sets to form a reconstructed image. The reconstructed image may be a two-dimensional (2D) image or a three-dimensional (3D) image, for example.

Another embodiment of the present invention comprises a system for processing acquired image data. The system includes means for performing a comparison operation on a current digital image data set and a next spatially adjacent digital image data set across a plurality of spatially contiguous digital image data sets to form a plurality of comparative image data sets. The plurality of spatially contiguous digital image data sets may be acquired over a current anatomical portion of a patient using a medical imaging modality. As an alternative, the plurality of spatially contiguous digital image data sets may be acquired over a current portion of a man-made structure or a current portion of a geological feature using, for example, a sonic imaging modality. The system further includes means for performing a first image compression operation on a designated keystone digital image data set of the plurality of spatially contiguous digital image data sets to form a compressed keystone data set. The system also includes means for performing a second image compression operation on each of the plurality of comparative image data sets to form a plurality of compressed comparative data sets. The system further includes means for storing the compressed keystone data set and the plurality of compressed comparative data sets. The means for storing may include an electronic digital memory.

The system may also include means for applying at least one thresholding operation to each of the plurality of comparative image data sets before performing the second image compression operation. The system may further include means for applying at least one spatial filtering operation to each of the plurality of comparative image data sets before performing the second image compression operation. The system may also include means for applying at least one data scaling operation to each of the plurality of comparative image data sets before performing the second image compression operation.

The system may further include means for performing a first image decompression operation on the stored compressed keystone data set to form an uncompressed designated keystone digital image data set, and means for performing a second image decompression operation on the stored plurality of compressed comparative data sets to form an uncompressed plurality of comparative image data sets. The first image decompression operation may be the same as or different than the second image decompression operation.

The system may further include means for performing a re-building operation on the uncompressed designated keystone digital image data set and the uncompressed plurality of comparative image data sets to form a re-built plurality of spatially contiguous digital image data sets. The system may further include means for applying a set of image processing parameters to the re-built plurality of spatially contiguous digital image data sets during an image processing operation to form an image processed plurality of spatially contiguous digital image data sets. The system may further include means for performing an image reconstruction operation on the image processed plurality of spatially contiguous digital image data sets to form a reconstructed image. The reconstructed image may be a two-dimensional (2D) image or a three-dimensional (3D) image, for example.

These and other novel features of the subject matter of the present application, as well as details of illustrated embodiments thereof, will be more fully understood from the following description and drawings.

DETAILED DESCRIPTION

Figure 1:
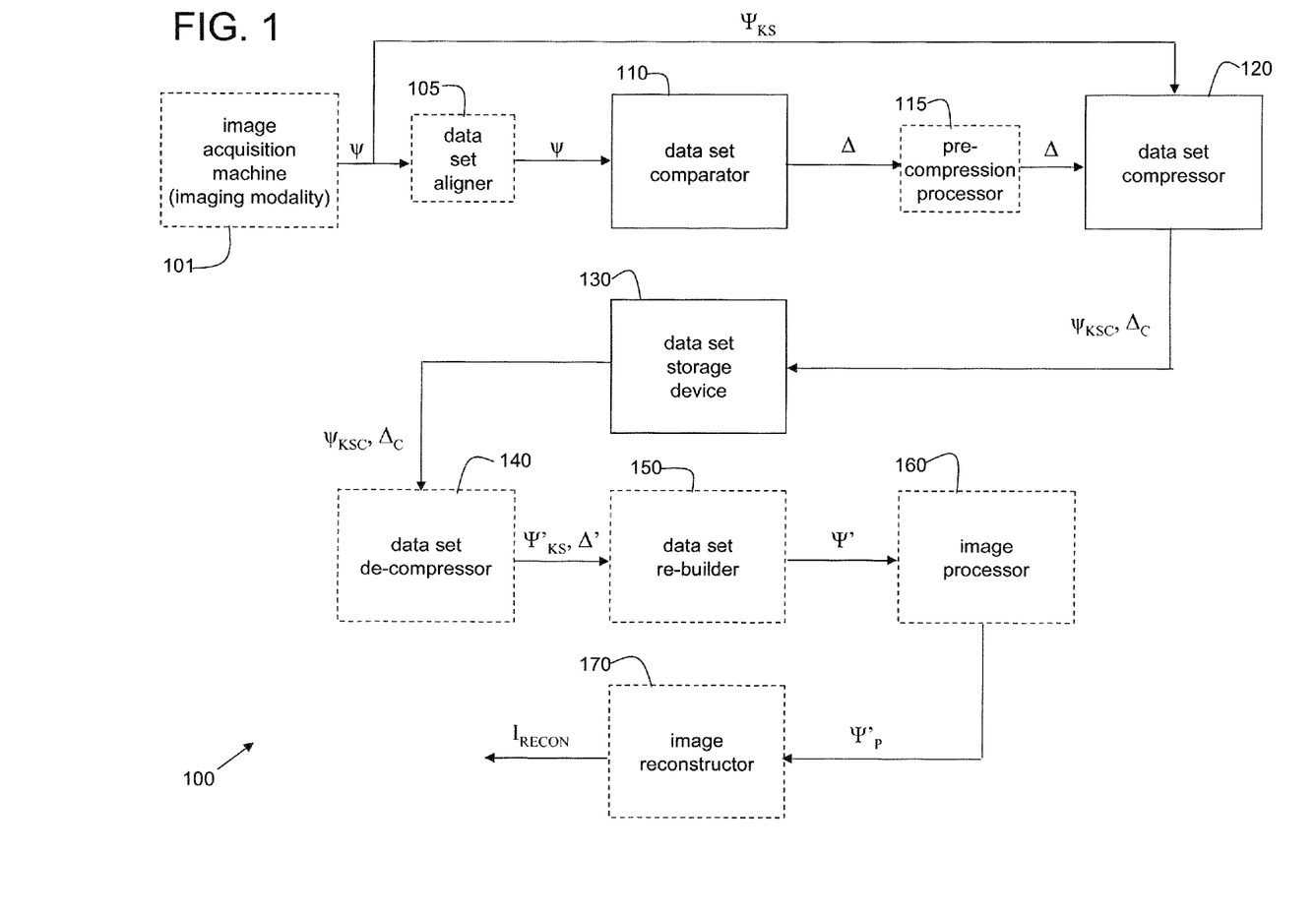
FIG. 1 illustrates a functional block diagram of an exemplary embodiment of a system for preparing spatially related digital image data sets for image compression and storage prior to image reconstruction.

FIG. 1 illustrates a functional block diagram of an exemplary embodiment of a system 100 for preparing spatially related medical digital image data sets for image compression and storage prior to image reconstruction. However, certain embodiments of the present invention may be applied to non-medical applications such as, for example, inspection of structural materials or geological features. The core of the system 100 includes a data set comparator 110, a data set compressor 120, and a data set storage device 130. Optionally, the system 100 may include some or all of a data set de-compressor 140, a data set re-builder 150, an image processor 160, an image reconstructor 170, an image acquisition machine 101, a data set aligner 105, and a pre-compression processor 115.

An input of the data set comparator 110 may be connected to an output of the image acquisition machine 101. As a further option, the data set aligner 105 may be operatively connected to the input of the data set comparator 110 and/or to the output of the image acquisition machine 101. The output of the data set comparator 110 is operatively connected to the input of the data set compressor 120. As an option, the pre-compression processor 115 may be operatively connected between the data set comparator 110 and the data set compressor 120.

An output of the data set compressor 120 is operatively connected to an input of the data set storage device 130. An output of the data set storage device 130 may be operatively connected to an input of the data set de-compressor 140. An output of the data set de-compressor 140 may be operatively connected to an input of the data set re-builder 150. An output of the data set re-builder 150 may be operatively connected to an input of an image processor 160. An output of the image processor 160 may be operatively connected to an input of the image reconstructor 170.

Various operative combinations of the functional elements 101-170 of the system 100 may be implemented on a computer-based platform, in accordance with various embodiments of the present invention. For example, various operative combinations of the functional elements 105-170 may be implemented in the image acquisition machine 101. As another example, various operative combinations of the functional elements 105-120 may be implemented on a computer work station or a personal computer (PC). The data set storage device 130 may be an image archiving subsystem (e.g., a PACS) or a database server, for example. Various operative combinations of the functional elements 140-170 may be implemented on a computer work station or a personal computer (PC), for example. Other operative combinations are possible as well. Certain functional elements may be implemented in hardware while others may be implemented in software, for example.

Figure 2:
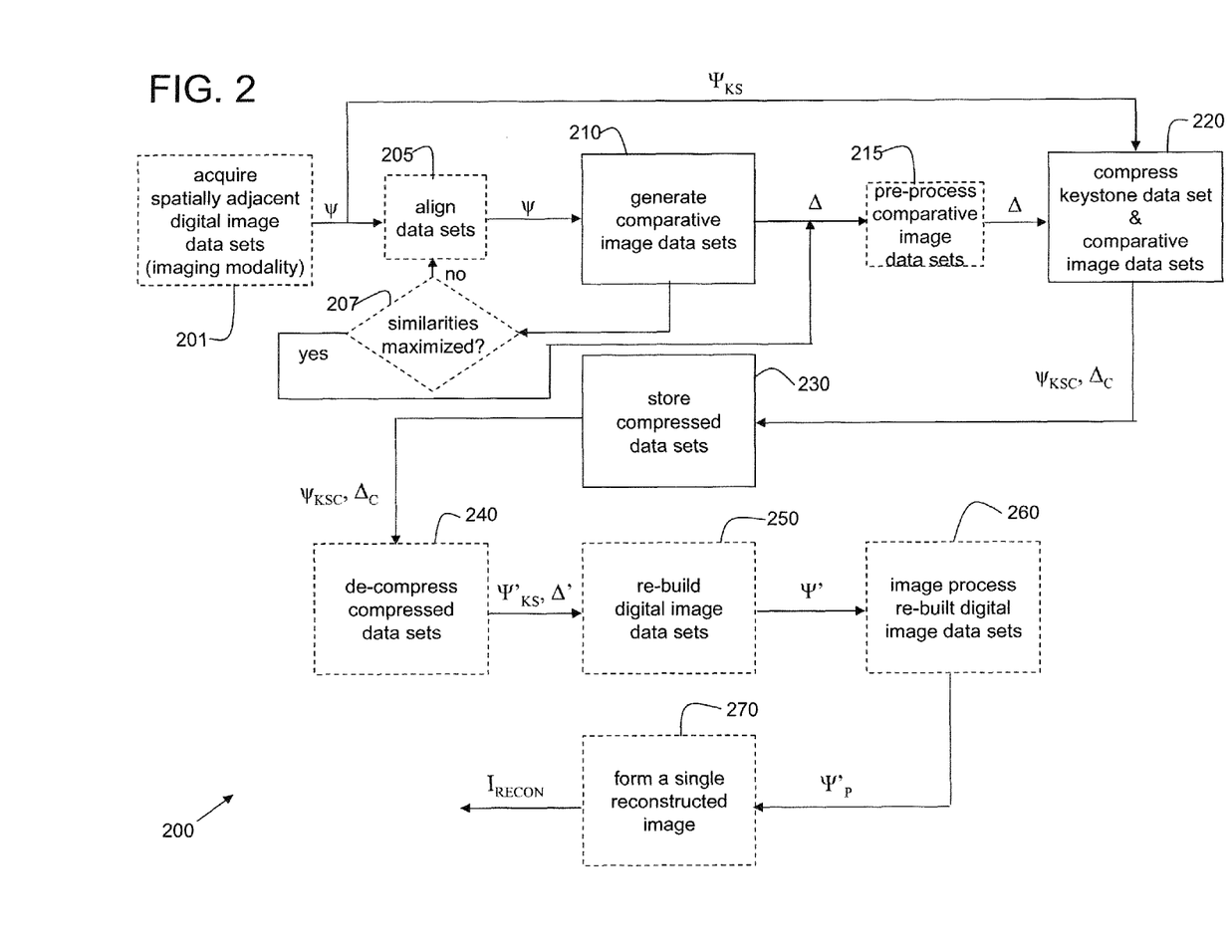
FIG. 2 illustrates a flow chart of an exemplary embodiment of a method for preparing spatially related digital image data sets for image compression and storage prior to image reconstruction using the system of FIG. 1.

FIG. 2 illustrates a flow chart of an exemplary embodiment of a method 200 for preparing spatially related medical digital image data sets for image compression and storage prior to image reconstruction using the system 100 of FIG. 1. The core method steps are steps 210, 220, and 230. Optionally, the method 200 may include some or all of the method steps 201, 205, 207, 215, and 240 through 270.

In general, the data set comparator 110 has access to a plurality of spatially contiguous digital image data sets Ψ. The plurality of spatially contiguous digital image data sets Ψ may be provided to the data set comparator 110 directly from the image acquisition machine 101 or indirectly from the image acquisition machine 101 via the data set aligner 105, in accordance with various embodiments of the present invention. As an alternative, the data set comparator 110 may read the plurality of spatially contiguous digital image data sets Ψ from, for example, a database or a memory storage device.

Figure 3A:
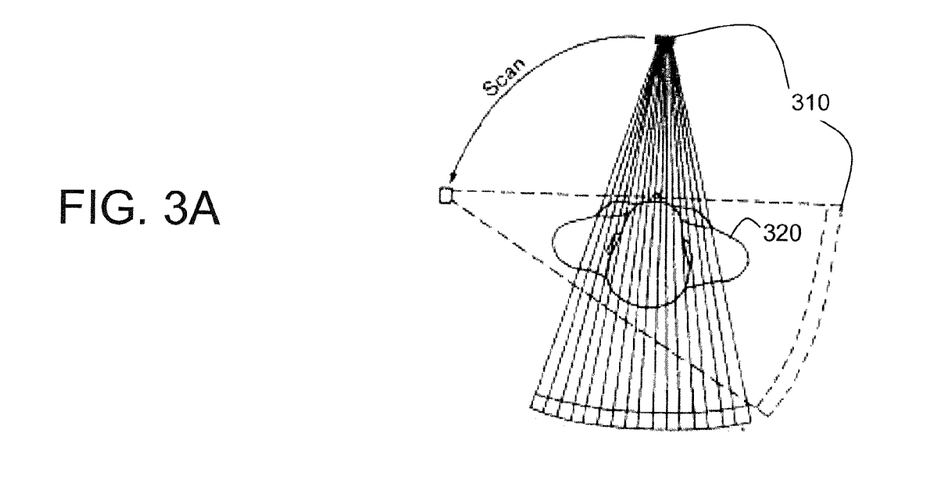
FIG. 3A is a diagram illustrating the concept of acquiring spatially contiguous digital image data sets corresponding to spatially contiguous views around an anatomical portion of a patient.
Figure 3B:
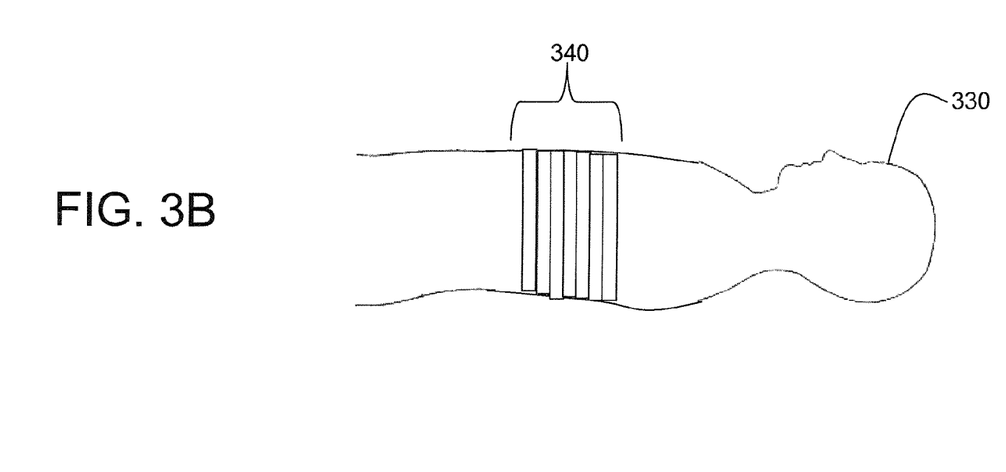
FIG. 3B is a diagram illustrating the concept of acquiring spatially contiguous digital image data sets corresponding to spatially contiguous slices across an anatomical portion of a patient.

In step 201 of the method 200, spatially adjacent digital image data sets Ψ may be acquired using an image acquisition machine 101 providing an imaging modality (e.g., X-ray, CT, ultrasound, PET, MRI). FIG. 3A is a diagram illustrating the concept of acquiring spatially contiguous digital image data sets corresponding to spatially contiguous views around an anatomical portion of a patient. For example, a CT machine 310 may rotate around a scanning axis to scan an anatomical portion of a patient 320, forming a plurality of spatially contiguous digital image data sets corresponding to spatially contiguous views. FIG. 3B is a diagram illustrating the concept of acquiring spatially contiguous digital image data sets corresponding to spatially contiguous slices across an anatomical portion of a patient. For example, an ultrasound machine or an MRI machine (not shown) may scan across an anatomical portion of a patient 330 forming a plurality of spatially contiguous digital image data sets corresponding to slices 340 across the anatomical portion of the patient. Such image acquisition techniques are well known in the art. It has been discovered that the data values of spatially adjacent digital image data sets are often very similar to each other, especially if the thickness of the slices or angular increment between the views is relatively small.

Figure 4:
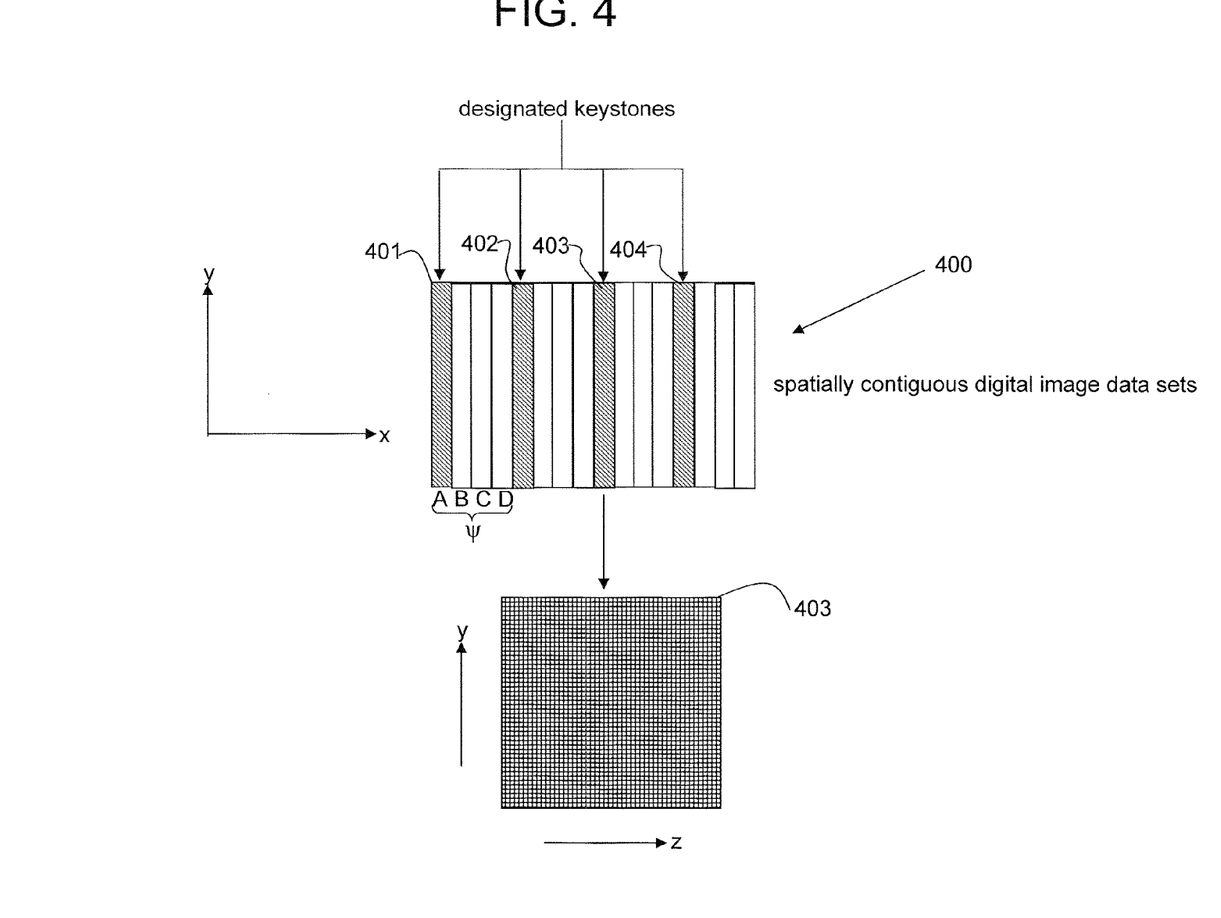
FIG. 4 is a diagram illustrating a plurality of spatially contiguous digital image data sets corresponding to a plurality of spatially adjacent slices or views and having designated keystone data sets, in accordance with an embodiment of the present invention.

FIG. 4 is a diagram illustrating a plurality of spatially contiguous digital image data sets 400 corresponding to a plurality of spatially adjacent slices or views and having designated keystone data sets 401, 402, 403, 404, in accordance with an embodiment of the present invention. The purpose of designating keystone data sets is described later herein. Each of the data sets of the plurality of data sets 400 may comprise two-dimensional arrays of pixel image data or voxel image data, for example, as shown for keystone data set 403 in FIG. 4. In step 205 of the method 200, the data sets 400 may be spatially aligned with each other using the data set aligner 105 before proceeding to step 210. For example, the image acquisition machine 101 may define a spatial frame of reference (e.g., a [x, y, z] coordinate system) which may be used by the data set aligner 105 to spatially align the data sets 400 on a pixel-by-pixel basis.

In accordance with an alternative embodiment of the present invention, any adjacent pair of data sets may be iteratively aligned or iteratively spatially shifted with respect to each other until, for example, a maximum number of similar pixels (see step 207) have been aligned with each other. Such spatial shifts are kept track of and may be used in the re-building step 250 when re-building the image data sets, as described later herein. Again, the alignment step is optional.

Figure 5:
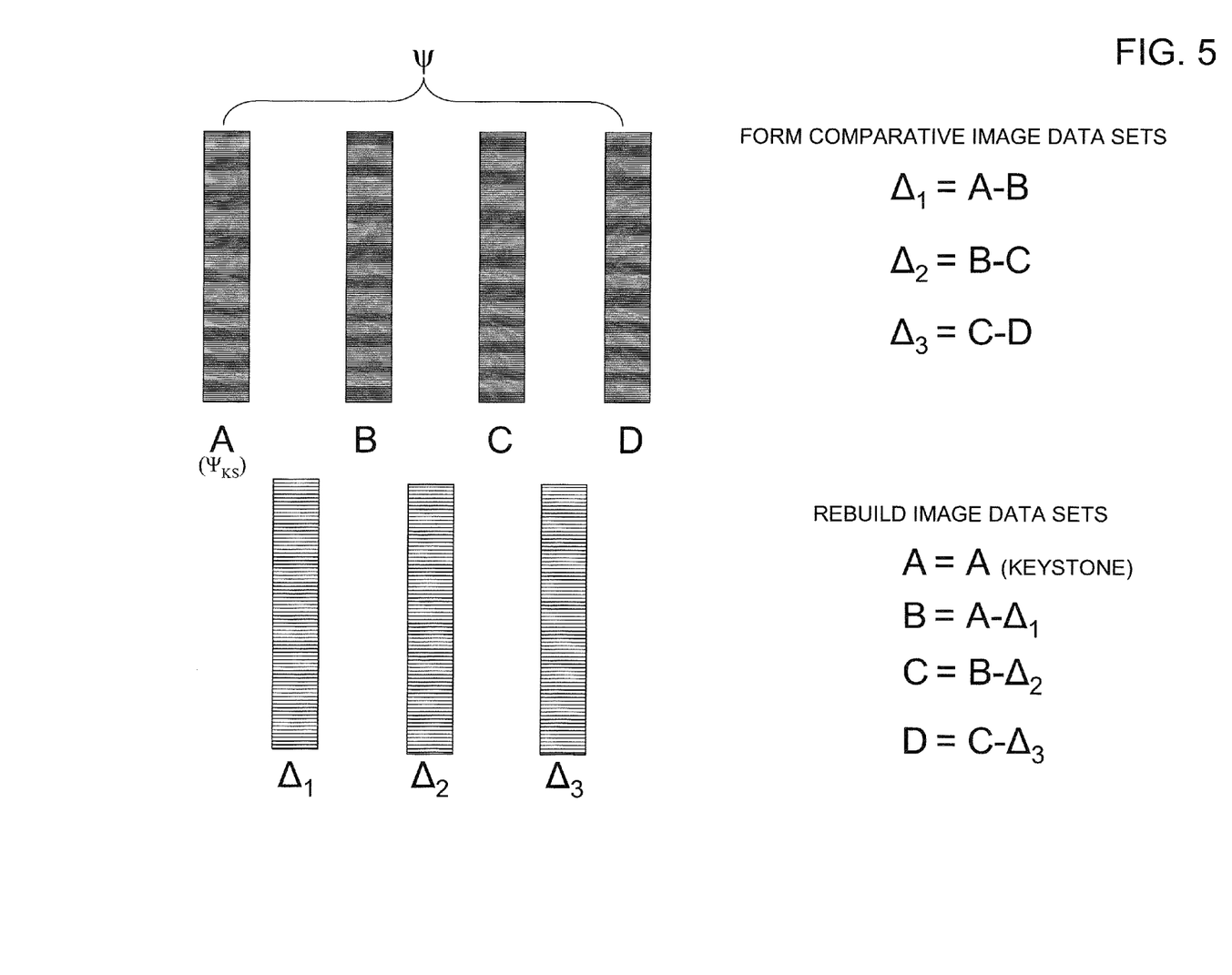
FIG. 5 is a diagram illustrating the concept of forming comparative image data sets and re-building image data sets from a keystone image data set and the comparative image data sets, in accordance with an embodiment of the present invention.

Once the data sets are aligned, the method proceeds to step 210 where the data set comparator 110 performs a comparison operation on a current digital image data set and a next spatially adjacent digital image data set across the plurality of spatially contiguous digital image data sets (Ψ). FIG. 5 is a diagram illustrating the concept of forming comparative image data sets and re-building image data sets from a keystone image data set and the comparative image data sets, in accordance with an embodiment of the present invention.

Referring to FIG. 5, four spatially contiguous digital image data sets (A, B, C, D) are shown. Data set A is spatially adjacent to data set B, data set B is spatially adjacent to data set C, and data set C is spatially adjacent to data set D. The data set comparator 110 generates the comparative image data set $\Delta_1$ from the image data sets A and B, generates the comparative image data set $\Delta_2$ from the image data sets B and C, and generates the comparative image data set $\Delta_3$ from the image data sets C and D. Image data set A is designated as the keystone image data set $\Psi_{KS}$ and may be used to re-build the other image data sets B, C, and D during the re-building step 250 as will be describe later herein.

Keystone image data sets may be designated periodically such that, for every keystone image data set $\Psi_{KS}$ (e.g., A), several other image data sets (e.g., B, C, D) are associated with that keystone image data set $\Psi_{KS}$. As an example, FIG. 4 shows four designated keystone image data sets $\Psi_{KS}$, each followed by three regular image data sets. A keystone image data set $\Psi_{KS}$ (e.g., A) is used to re-build the associated regular image data sets (e.g., B, C, D), as will be described later herein. The frequency of designating keystone image data sets may be determined through analysis or experimentation by operating on actual acquired image data sets, determining compression efficiency versus loss in image quality.

Referring to FIG. 5, in accordance with an embodiment of the present invention, the data set comparator 110 may perform a simple subtraction operation on the adjacent image data sets Ψ in step 210 on a pixel-by-pixel (or voxel-by-voxel) basis.

For example, $$\Delta_1 = A - B;$$

$$\Delta_2 = B - C; \text{ and}$$

$$\Delta_3 = C - D.$$

The greater the similarlity between adjacent data sets (i.e., the more similar are corresponding pixel image values), the closer more of the resultant data values in the comparative image data sets are to a value of zero, and the more the dynamic range of the data values to be subsequently compressed in step 220 is reduced.

Figure 6A:
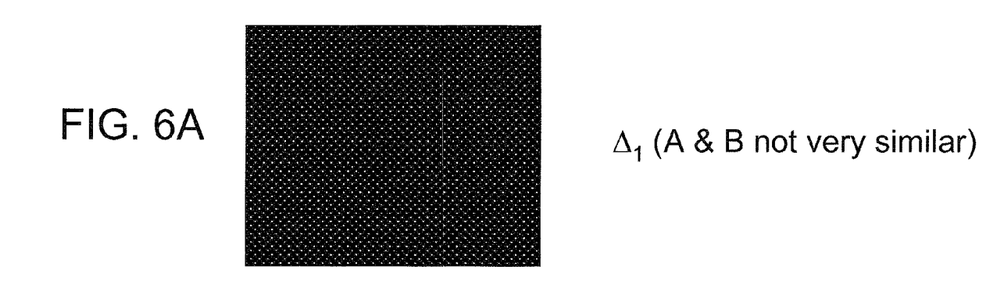
FIGS. 6A-6C illustrate the concept of reducing the amount of data to be compressed by forming comparative image data sets, in accordance with an embodiment of the present invention.
Figure 6B:
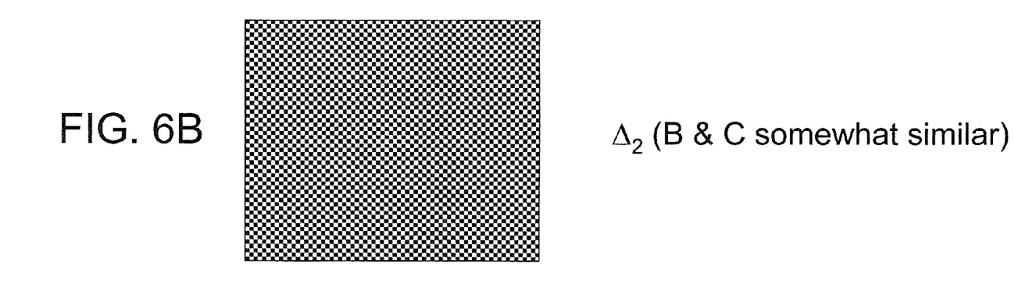
Figure 6C:
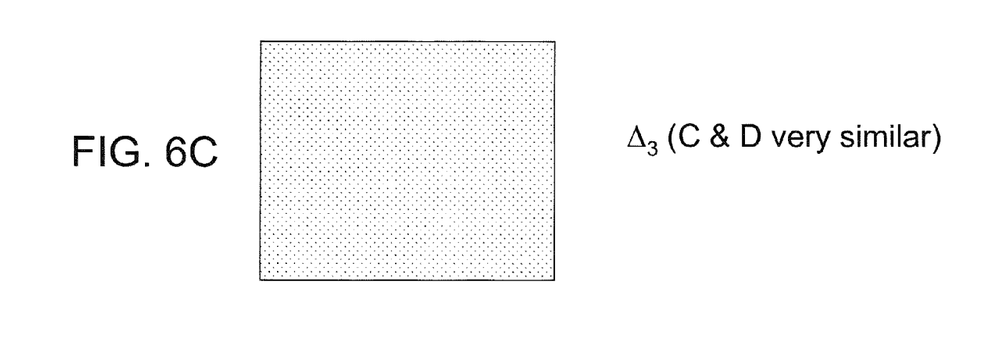

For example, FIGS. 6A-6C illustrate the concept of reducing the amount of data to be compressed by forming comparative image data sets Δ, in accordance with an embodiment of the present invention. In FIGS. 6A-6C, the more black shown in a comparative image data set, the less similar are the adjacent image data sets. Likewise, the more white shown in a comparative image data set, the more similar are the adjacent image data sets. Embodiments of the present invention, exploit the expected similarities between adjacent image data sets to effectively reduce the amount of data that needs to be compressed.

The comparative image data set $\Delta_1$ of FIG. 6A indicates that data set A and data set B are not very similar to each other. Therefore, when $\Delta_1$ is compressed, not much of an increase in compression efficiency is gained from the comparison operation. However, the comparative image data set $\Delta_3$ of FIG. 6C indicates that data set C and data set D are quite similar to each other. Therefore, when $\Delta_3$ is compressed, a significant increase in compression efficiency is gained from the comparison operation. The comparative image data set $\Delta_2$ of FIG. 6B indicates that image data set B and image data set C are somewhat similar, but not as similar as image data sets C and D, and not as dissimilar as image data sets A and B and, therefore, a moderate increase in compression efficiency may be achieved.

Other comparison operations, other than simple subtraction, are possible as well. For example, an alternative comparison operation may perform a mapping operation based on the pixel values in the adjacent image data sets. For example, any two pixel values from adjacent image data sets corresponding to a same pixel location may be used to address a look-up table that maps and assigns a particular data value to a corresponding pixel location in the comparative image data set. Such mappings may be based on experimental results that yield good image data set compression and good image data set re-building, for example.

Referring again to FIG. 2, after the comparative image data sets have been generated then, in step 215, the comparative image data sets may be pre-processed by the pre-compression processor 115. Again, step 215 is optional. For example, the pre-compression processor 115 may perform a thresholding operation, a spatial filtering operation, and/or a data scaling operation on each of the comparative image data sets. A thresholding operation may threshold out data values which are close to zero, for example. A spatial filtering operation may apply a low-pass, high-pass, or band-pass digital filter to smooth out certain types of data transitions, for example. A data scaling operation may apply a scaling factor to the data to modify the dynamic range of the data, to shift the values of the data to a more desirable range for compression, or to normalize the data, for example.

In step 220, the data set comparator applies at least one image compression scheme to the keystone data set $\Psi_{KS}$ and to each of the comparative image data sets $\Delta$ to form a compressed keystone data set $\Psi_{KSC}$ and compressed comparative image data sets $\Delta_C$. Any of a variety of image compression schemes may be used such as, for example, wavelet transform-based, Fourier transform-based, discrete cosine transform-based (e.g., JPEG), fractal-based, Huffman coding-based, run-length encoding, and superstring, which are all well-known in the art. By compressing only the keystone data set $\Psi_{KS}$ and the comparative image data sets $\Delta$ (e.g., $\Delta_1$, $\Delta_2$, $\Delta_3$) instead of the full image data sets (e.g., A, B, C, D), greater levels of compression may be achieved. As a result, in step 230, the compressed data sets $\Psi_{KSC}$ and $\Delta_C$ may be stored in the data storage device 130, taking up less storage space than would be taken up by compressing and storing the full image data sets (e.g., A, B, C, D), thus saving storage space. A same image compression scheme may be applied to the keystone image data set $\Psi_{KS}$ and the comparative image data sets $\Delta$ in step 220, or different compression schemes may be applied, in accordance with various embodiments of the present invention.

Once the data sets have been efficiently compressed and stored, a user may access the compressed image data sets to re-construct and view an image (e.g., a two-dimensional 2D image or a three-dimensional 3D image). However, before an image may be reconstructed from the compressed image data sets, the compressed image data sets have to be de-compressed and re-built into the original full image data sets (e.g., A, B, C, D), or at least close representations of those full image data sets (e.g., A', B', C', D').

In step 240, the data set de-compressor 140 accesses the compressed data sets $\Psi_{KSC}$ and $\Delta_C$ from the data set storage device 130 and performs a de-compression operation on the compressed data sets $\Psi_{KSC}$ and $\Delta_C$ to form uncompressed data sets $\Psi'_{KS}$ and $\Delta'$ which are almost identical to but may be slightly different from the original image data sets $\Psi_{KS}$ and $\Delta$ due to possible compression losses and/or thresholding or filtering operations. The de-compression operation in step 240 essentially performs the reverse of the compression operation in step 220.

In step 250, the data set re-builder 150 attempts to re-build the original full image data sets $\Psi$ (e.g., A, B, C, D) from the uncompressed data sets $\Psi'_{KS}$ and $\Delta'$. However, since the uncompressed data sets $\Psi'_{KS}$ and $\Delta'$ are not identical to the data sets $\Psi_{KS}$ and $\Delta$ as previously discussed herein, the re-built image data sets $\Delta'$ (e.g., A', B', C', D') will be slightly different from the true original image data sets $\Psi$ (e.g., A, B, C, D). Ideally, any differences in the image data sets are small enough so as not to significantly degrade image quality after image reconstruction in step 170.

Referring to FIG. 5, based on the simple subtraction technique applied in step 210, the full image data sets $\Psi'$ may be re-built by reversing the subtraction operation as follows:

$$A' = \Psi'_{KS};$$

$$B' = A' - \Delta_1;$$

$$C' = B' - \Delta_2; \text{ and}$$

$$D' = C' - \Delta_3.$$

When some other comparison operation (e.g., mapping) is used in step 210, in accordance with other embodiments of the present invention, the data set re-builder 150 will essentially perform the reverse of that operation to re-build the image data sets.

In step 260, the image processor 160 may apply a set of image processing parameters to the re-built image data sets $\Psi'$ (e.g., A', B', C', D'). For example, any of spatial filtering, contrast filtering, thresholding, normalizing, noise reduction, equalization, may be performed within or across the re-built image data sets. Other image processing techniques are possible as well. Such image processing techniques are well known in the art. As a result, since the compressed image data sets are stored on the data set storage device 130, different image processing parameters may be applied to the image data sets each time the compressed image data sets are recalled for image reconstruction, if desired.

In step 270, the image reconstructor 170 forms (i.e., reconstructs) a single 2D or 3D image, $I_{RECON}$, from the plurality of re-built (and possibly image processed) image data sets $\Psi_P$. Such image reconstruction techniques are well known in the art and may be implemented in hardware and/or software. A reconstructed image, $I_{RECON}$, may be constructed from a plurality of spatially contiguous digital image data sets including a plurality of keystone image data sets and associated regular image data sets, for example. Alternatively, a reconstructed image, $I_{RECON}$, may be constructed from a plurality of spatially contiguous digital image data sets including only one keystone image data set and its associated regular image data sets, for example.

In summary, a system and method of processing acquired image data by preparing spatially related medical digital image data sets for image compression are disclosed. Spatially adjacent image data sets that are acquired during a medical imaging procedure may be compared to each other to form comparative image data sets. The more similar any pair of spatially adjacent image data sets are to each other, the greater the image compression efficiencies that may be achieved.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A method of processing acquired image data, said method comprising:
   (a) performing a comparison operation on a current digital image data set and a next spatially adjacent digital image data set across a plurality of spatially contiguous digital image data sets associated with a designated keystone digital image data set to form a plurality of comparative image data sets;
   (b) performing a first image compression operation on the designated keystone digital image data set of said plurality of spatially contiguous digital image data sets to form a compressed keystone data set;
   (c) performing a second image compression operation on each of said plurality of comparative image data sets to form a plurality of compressed comparative data sets; and
   (d) storing said compressed keystone data set and said plurality of compressed comparative data sets.

2. The method of claim 1 wherein said plurality of spatially contiguous digital image data sets were acquired over a current anatomical portion of a patient using a medical imaging modality.

3. The method of claim 1 wherein said plurality of spatially contiguous digital image data sets were acquired over a current portion of a man-made structure using an imaging modality.

4. The method of claim 1 wherein said plurality of spatially contiguous digital image data sets were acquired over a current portion of a geological feature using an imaging modality.

5. The method of claim 1 further comprising applying at least one thresholding operation to each of said plurality of comparative image data sets before performing said second image compression operation.

6. The method of claim 1 further comprising applying at least one spatial filtering operation to each of said plurality of comparative image data sets before performing said second image compression operation.

7. The method of claim 1 further comprising applying at least one data scaling operation to each of said plurality of comparative image data sets before performing said second image compression operation.

8. The method of claim 2 wherein said spatially contiguous digital image data sets correspond to spatially contiguous slices across said current anatomical portion of said patient.

9. The method of claim 2 wherein said spatially contiguous digital image data sets correspond to spatially contiguous views around said current anatomical portion of said patient.

10. The method of claim 1 wherein said comparison operation includes a simple pixel-by-pixel subtraction between said current digital image data set and said next spatially adjacent digital image data set.

11. The method of claim 1 wherein said comparison operation includes a simple voxel-by-voxel subtraction between said current digital image data set and said next spatially adjacent digital image data set.

12. The method of claim 1 wherein said storing includes electronically saving to an electronic digital memory.

13. The method of claim 2 further comprising repeating steps (a) through (d) for a next anatomical portion of said patient, wherein said next anatomical portion of said patient is spatially adjacent to said current anatomical portion of said patient.

14. The method of claim 1 further comprising:
   performing a first image decompression operation on said stored compressed keystone data set to form an uncompressed designated keystone digital image data set; and
   performing a second image decompression operation on said stored plurality of compressed comparative data sets to form an uncompressed plurality of comparative image data sets.

15. The method of claim 14 further comprising performing a re-building operation on said uncompressed designated keystone digital image data set and said uncompressed plurality of comparative image data sets to form a re-built plurality of spatially contiguous digital image data sets.

16. The method of claim 15 further comprising applying a set of image processing parameters to said re-built plurality of spatially contiguous digital image data sets during an image processing operation to form an image processed plurality of spatially contiguous digital image data sets.

17. The method of claim 16 further comprising performing an image reconstruction operation on said image processed plurality of spatially contiguous digital image data sets to form a reconstructed image.

18. The method of claim 17 wherein said reconstructed image is a two-dimensional image.

19. The method of claim 17 wherein said reconstructed image is a three-dimensional image.

20. The method of claim 1 wherein at least one of said image compression operations comprises a wavelet-based image compression scheme.

21. The method of claim 1 wherein at least one of said image compression operations comprises a fractal-type image compression scheme.

22. The method of claim 1 wherein at least one of said image compression operations comprises a JPEG-type image compression scheme.

23. The method of claim 1 wherein at least one of said image compression operations comprises a superstring compression scheme.

24. The method of claim 1 wherein at least one of said image compression operations comprises a run-length encoding compression scheme.

25. The method of claim 1 wherein said first image compression operation is the same as said second image compression operation.

26. The method of claim 14 wherein said first image decompression operation is the same as said second image decompression operation.

27. A system for processing acquired image data, said system comprising:
   means for performing a comparison operation on a current digital image data set and a next spatially adjacent digital image data set across a plurality of spatially contiguous digital image data sets associated with a designated keystone digital image data set to form a plurality of comparative image data sets;
   means for performing a first image compression operation on the designated keystone digital image data set of said plurality of spatially contiguous digital image data sets to form a compressed keystone data set;

means for performing a second image compression operation on each of said plurality of comparative image data sets to form a plurality of compressed comparative data sets; and means for storing said compressed keystone data set and said plurality of compressed comparative data sets.

28. The system of claim 27 wherein said plurality of spatially contiguous digital image data sets were acquired over a current anatomical portion of a patient using a medical imaging modality.

29. The system of claim 27 wherein said plurality of spatially contiguous digital image data sets were acquired over a current portion of a man-made structure using an imaging modality.

30. The system of claim 27 wherein said plurality of spatially contiguous digital image data sets were acquired over a current portion of a geological feature using an imaging modality.

31. The system of claim 27 further comprising means for applying at least one thresholding operation to each of said plurality of comparative image data sets before performing said second image compression operation.

32. The system of claim 27 further comprising means for applying at least one spatial filtering operation to each of said plurality of comparative image data sets before performing said second image compression operation.

33. The system of claim 27 further comprising means for applying at least one data scaling operation to each of said plurality of comparative image data sets before performing said second image compression operation.

34. The system of claim 28 wherein said spatially contiguous digital image data sets correspond to spatially contiguous slices across said current anatomical portion of said patient.

35. The system of claim 28 wherein said spatially contiguous digital image data sets correspond to spatially contiguous views around said current anatomical portion of said patient.

36. The system of claim 27 wherein said comparison operation includes a simple pixel-by-pixel subtraction between said current digital image data set and said next spatially adjacent digital image data set.

37. The system of claim 27 wherein said comparison operation includes a simple voxel-by-voxel subtraction between said current digital image data set and said next spatially adjacent digital image data set.

38. The system of claim 27 wherein said means for storing includes an electronic digital memory.

39. The system of claim 27 further comprising:
means for performing a first image decompression operation on said stored compressed keystone data set to form an uncompressed designated keystone digital image data set; and
means for performing a second image decompression operation on said stored plurality of compressed comparative data sets to form an uncompressed plurality of comparative image data sets.

40. The system of claim 39 further comprising means for performing a re-building operation on said uncompressed designated keystone digital image data set and said uncompressed plurality of comparative image data sets to form a re-built plurality of spatially contiguous digital image data sets.

41. The system of claim 40 further comprising means for applying a set of image processing parameters to said re-built plurality of spatially contiguous digital image data sets during an image processing operation to form an image processed plurality of spatially contiguous digital image data sets.

42. The system of claim 41 further comprising means for performing an image reconstruction operation on said image processed plurality of spatially contiguous digital image data sets to form a reconstructed image.

43. The system of claim 42 wherein said reconstructed image is a two-dimensional image.

44. The system of claim 42 wherein said reconstructed image is a three-dimensional image.

45. The system of claim 27 wherein at least one of said image compression operations comprises a wavelet-based image compression scheme.

46. The system of claim 27 wherein at least one of said image compression operations comprises a fractal-type image compression scheme.

47. The system of claim 27 wherein at least one of said image compression operations comprises a JPEG-type image compression scheme.

48. The system of claim 27 wherein at least one of said image compression operations comprises a superstring compression scheme.

49. The system of claim 27 wherein at least one of said image compression operations comprises a run-length encoding compression scheme.

50. The system of claim 27 wherein said first image compression operation is the same as said second image compression operation.

51. The system of claim 39 wherein said first image decompression operation is the same as said second image decompression operation.

* * * * *